Nov. 12, 1935.  G. R. HOOVER ET AL  2,020,891
METHOD AND APPARATUS FOR TESTING ORGANIC COATINGS
Filed Feb. 20, 1932
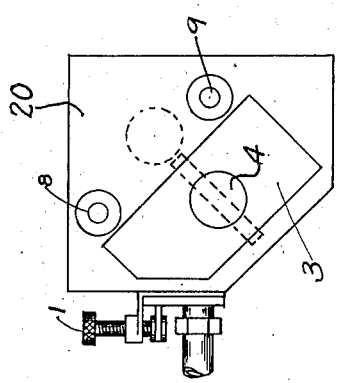
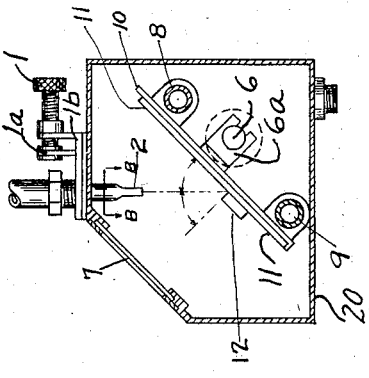
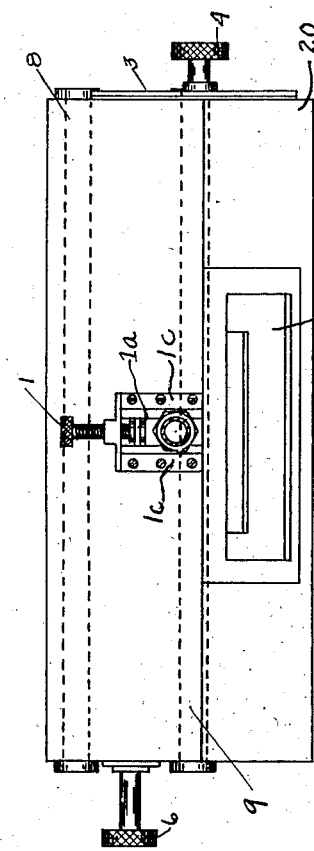
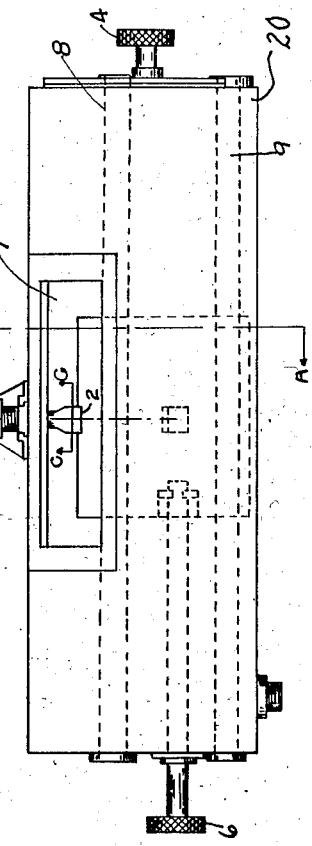
INVENTORS
George R. Hoover
George E. Shafer
BY
Allen & Allen
ATTORNEYS Patented Nov. 12, 1935

2,020,891

UNITED STATES PATENT OFFICE 2,020,891

METHOD AND APPARATUS FOR TESTING ORGANIC COATINGS

George R. Hoover and George E. Shafer, Middletown, Ohio, assignors to The American Rolling Mill Company, Middletown, Ohio, a corporation of Ohio Application February 20, 1932, Serial No. 594,298

7 Claims. (Cl. 73—51)

This invention in its broadest sense relates to a machine and process by which water under pressure impinging on an organic coating will be a test of its adherence.

Specifically, this invention relates to a method and apparatus for measuring the desired properties of organic coatings, such as asphalt, coal tar, coal tar enamel, paint, enamel, lacquer and the like, in order to determine their utility for commercial use.

Considered in its aspects as a method, the present invention consists in subjecting a predetermined size specimen of organic material to hydraulic pressure in such a way that the degree of adhesiveness of the specimen may be calculated and determined, according to the length of time required to detach the organic coating from the surface to which it previously adhered.

Considered in its aspects as an apparatus, the present invention consists in a mechanism for accomplishing the results heretofore mentioned, and reference may be had to the accompanying drawing, which shows one embodiment; but it is understood that the process may be accomplished by other means than those shown specifically herein and for this reason we do not desire to limit ourselves to the one form, as this is illustrative only of how our invention is accomplished.

The greatest value of this apparatus and method resides in its ability to determine the adhesive quality of an organic coating and to determine, for instance, whether asphalt, of a certain known composition, is non-aging. By this, we mean that with this method and machine we may test a specimen of asphalt immediately after it is manufactured. Also from the same batch, we may subject a like specimen to weather conditions, to varying atmospheres and to conditions similar to those encountered when asphalt is used as a coating for culverts, drains, roofs, etc. At the end of a given time, we may test this second specimen by the same method and apparatus as was formerly used and under the same conditions. If the asphalt adheres as a coating to the surface of the pipe or culvert, and only loosens therefrom at the expiration of the same amount of time required to loosen the first specimen, it then becomes apparent that the tested asphalt has not changed with age. It is quite advantageous, in commercial use, to determine in advance the adhesiveness, permeability and non-aging characteristics of materials of this nature.

As a further example of what we accomplish by our method of testing two blends of air-blown asphalt were chosen. When applied as a protective covering to metal and tested by our apparatus and method, the first sample separated from its base in 32 minutes, while the second sample adhered for only 5½ minutes. We will now describe our apparatus, after which a further explanation of our method will be given.

Our invention consists in the features of construction and in the process as hereinafter set forth and claimed.

In the drawing:

Fig. 1 is a plan view of the apparatus with the supply water pipe shown in section.

Fig. 2 is an end view of the same.

Fig. 3 is a front elevation.

Fig. 4 is a section taken on line A—A of Fig. 3.

Fig. 5 is a section of the nozzle taken on line B—B of Fig. 4.

Fig. 6 is a section of the nozzle taken on line C—C of Fig. 3.

The drawing illustrates several views of a machine for applying our test to organic coatings as mentioned above. The machine comprises a casing indicated generally at 20. The thumb screw marked 1 (Figures 1, 2 and 3) provides a method for adjusting the position of the nozzle 2 in the direction of the axis of the said screw. This screw is rotatably mounted in the arm 1a and is threaded into a bracket 1b slidably mounted on the casing by means of guides 1c. The bracket bears the nozzle structure 2 by means of which a fluid jet is introduced. 3 is a door for inserting the test piece, and 4 is a latching device for closing the door. In order to adjust the sample of the material being tested with reference to the nozzle, we provide a platform 10, supported slantwise beneath the nozzle 2 upon longitudinal rods 8 and 9 fastened to the ends of our casing. The platform is slidable along these rods, and its position may be adjusted by means of a headed rod 6 attached to a bracket 6a on the platform, and slidable through the end of the casing. An observation window 7 (Figures 1, 3 and 4) is provided, preferably in the slanting front portion of the casing, in order that the observer may see when the coating loosens from its base.

We have shown at 11 the piece of metal, or the like, to which the coating 12 is applied in proper position on the support 10; and the coating sample 12 is shown in its proper relation to the assembled parts. It is not a departure from our invention to provide, if desired, means for changing the impinging angle of the liquid stream, means to vary the angle of the platform 10, or means to adjust the platform 10 in a direction transverse to the movement of the headed rod 6.

In the use of our device we may proceed as follows: We may coat the object 11 (which will, of course, be chosen to represent a particular condition), cover a piece of the object, or similar objects, with a desired coating and then carefully cut away all of the said coating except a piece or series of pieces about ⅜ to ½" square. In so doing care should be exercised to avoid disturbing the part of the coating remaining, the adhesive qualities of which it is desired to measure. Thus we may coat a piece of galvanized iron with asphalt, and then cut away portions of the asphalt coating as desired. It is also desirable for most consistent results, to have the edges of the matter being tested, cut at right angles to the object coated, and the angle of application of the stream or jet should, for quick results, bisect the said angle, at or about 45° with the object coated.

This method of preparing samples is not a limitation upon our invention, and samples may be otherwise prepared as desired, being careful of course to keep the conditions of preparation fairly constant to secure comparative results. There is no restriction in the use of our machine to samples of any particular character, nor to samples affixed to any particular character of support. The adhesion of bitumen to galvanized iron, of paint to metal, of cement to wood or metal, etc. being examples of uses.

The jet should impinge against the plate or coated object, so that the impinging stream strikes the said object first and is deflected thereby against the joint or point of union of coating and coated material with a knife-like action.

It is understood, of course, that the nature and surface of the object to which the coating is applied effects the adhesive and adhering qualities of the said coating. However, if various types of coatings, of various compositions, are tested on the same basis and under the same conditions, comparative results of the adhesive properties of the said coatings are obtained. The size of the nozzle, quantity of liquid, and the hydraulic pressure thereof should be such that the impact is not violent but that very small differences in degree in the adhesive properties of the coatings can be detected.

We have found that if a flat stream is employed, the velocity of which is practically uniform throughout its width and such that the width of the stream is approximately equal to or greater than the width of the specimen being tested, the results are very uniform.

The liquid used will preferably be inert with respect to the materials being tested and should be controlled in temperature where temperature changes may affect the characteristics of the coatings being tested. Ordinary organic coatings, such as asphalt, have a tendency to soften with heat and the adhesive qualities are affected thereby; hence it is preferable to keep liquid at a controlled and relatively low standard temperature when testing such materials, say a temperature below 100° F.

On account of the great variety of organic compounds, and their uses, consumers of the said compounds have been unable heretofore satisfactorily and definitely to determine by any test the adhesive and age-lasting qualities of said compounds; and our invention has particular utility in this field.

To illustrate such a use of our method:

Two commercial asphaltic compounds were tested on identical surfaces of sheet metal, under the same conditions and gave the following results: Two days after application #1 withstood the stream 23 minutes before severance; when seven weeks old, 20 minutes; seven months, 17 minutes. No. 2, two days after application withstood the stream 28 minutes; when four weeks old, 7 minutes; when three months old, 3 minutes.

By this test we were able to determine that #1, was the most valuable as a protective and permanent coating for uses such as culverts, drains, roofs, etc. No such determination has been possible heretofore in advance of actual use.

Again by our method and apparatus we are able to determine the relative adhesion of any number of types of coating materials to different surfaces; and the apparatus and method may be used to determine the relative adhesion of a specific type of coating to any number of types of surfaces. For example, one set of tests showed the adhesion time of a particular asphalt was 43 minutes on a black iron enameled sheet. The same composition of asphalt showed an adhesion time of 27 minutes on a galvanized iron sheet.

Certain variables should be taken into account in making tests. First, of course, is the composition of the material to be tested. Second is the character of the support.

The third element is the water volume or size of jet. We have used to good advantage a spray nozzle ⅛" in width, and having a stream velocity approximately 32 feet per second. This nozzle delivered about 2 gallons of water per minute. The volume of water and size of jet may be varied to suit the requirements of particular materials being tested.

The fourth element is the hydraulic pressure. We have varied this pressure from 60 to 85 pounds per square inch. Below 60 pounds per square inch we have found that non-uniform results are obtained with bituminous substances; but above 85 pounds per square inch soft tar and asphalt coatings are badly distorted and doubtful results are obtained. For other materials other pressure limits may be employed.

The fifth variable is the temperature of the fluid. This does not have any marked effect on the adhesion time within limits. Thus within the temperature range found in city water systems our results on bitumens are uniform. Our tests have covered temperatures from 50° F. to 125° F. and have shown no noticeable difference in the adhesion. But there are some low melting types of asphalt and tar that will begin to distort at temperatures above 75° F. and cannot be tested above that temperature. Since the temperature of tap or city water under normal conditions does not usually exceed 70° F. or drop below 50° F., the test can be made with tap city water providing the hydraulic pressure falls within the above specified range. Temperature has, however, more marked effects on other substances, and may be controlled as desired for uniformity of results.

The sixth variable to be considered is the most satisfactory position for the jet of water, whether it is striking exactly at the edge of the island of coating substance or slightly off of or away from the edge. We have found the best results by the jet of water striking about 1/32" above the top edge of the island of coating under test.

The seventh variable may be the angle or direction of the water stream. We have run tests with the stream at an angle of 30° to 75° to the face of the coated sheet. However, by experience we have found that an angle of 45° is the most efficient.

Having thus described our invention, what we claim as new and desire to secure by Letters Patent, is:—

1. An apparatus for testing the adhesive properties of coatings, comprising a support for a piece of material having an isolated area covered by a coating substance, a nozzle, means to hold the said nozzle fixedly in a desired lateral position with reference to the said support, and means for adjusting the support with reference to the said nozzle in another direction so that a jet of fluid from said nozzle will impinge upon said piece at the juncture of said piece and said coating, said support and said nozzle bearing a fixed angular relationship of substantially 45°.

2. An apparatus for testing the adhesive properties of coatings and the like, which comprises a support for holding a piece of partially coated material having a substantially linear juncture of said coating and said material, a nozzle for producing a flat jet of liquid, and means to hold the said nozzle fixedly in such a position with respect to the juncture of the material and the coating thereon that said jet will impinge against said material along the line of the juncture of the said coating therewith.

3. An apparatus for testing the adhesive properties of protective coatings, which comprises a support for a flat object which has an isolated coated area, means including a nozzle for producing a flat liquid stream, means for holding said nozzle fixedly in any desired lateral position with respect to said object, and means for adjusting the said support in another direction with reference to said nozzle, for the purpose of causing the liquid stream to impinge against the object at the junction of the coating and the said object, and at an angle to the surface of said object so as to have a peeling action on the coating thereon.

4. A method of testing the adhesive qualities of coatings which consists in coating a base material with a layer of the coating to be tested, and subjecting the juncture of the said layer and the said material to the action of blast of fluid directed at an angle to the surface of said material, and measuring the time required thus to pry the said coating off the base material under known conditions of temperature, volume and pressure.

5. A method of testing the adhesive qualities of organic compounds, which consists in isolating a small uniformly applied portion of the coating material upon a base, and subjecting the juncture of said coating with said base to a blast of fluid under pressure directed at an angle to said base and shaped to impinge upon said base for a substantial distance along the line of said juncture, and measuring the time required thus to separate the said coating from said base under known conditions of temperature, volume and pressure.

6. A method of testing organic compounds, such as asphalt, paint, and the like, which comprises forming a film of the substance to be tested upon a base of desired substance, exposing the junction of one edge of said film and said base to a hydraulic jet, of constant temperature, volume and pressure, and measuring the time elapsing until said film is released or is loosened from its base.

7. A method of testing organic coating compounds, such as asphalt, paint, and the like, which comprises forming a film of the substance to be tested upon a base of desired substance, exposing the junction of one edge of said film and said base to the action of a hydraulic jet at predetermined conditions of temperature, pressure, and flow, and measuring the time elapsing until said film is released or is loosened from its base.

GEORGE R. HOOVER.
GEORGE E. SHAFER.